US008326368B2

(12) United States Patent
Sawada et al.

(10) Patent No.: US 8,326,368 B2
(45) Date of Patent: Dec. 4, 2012

(54) MOBILE COMMUNICATION TERMINAL

(75) Inventors: Kayoko Sawada, Osaka (JP); Tatsuhiko Abe, Osaka (JP)

(73) Assignee: KYOCERA Corporation, Kyoto (JP)

( * ) Notice: Subject to any disclaimer, the term of this patent is extended or adjusted under 35 U.S.C. 154(b) by 140 days.

(21) Appl. No.: 12/810,491

(22) PCT Filed: Dec. 25, 2008

(86) PCT No.: PCT/JP2008/073590
§ 371 (c)(1),
(2), (4) Date: Jun. 24, 2010

(87) PCT Pub. No.: WO2009/084583
PCT Pub. Date: Jul. 9, 2009

(65) Prior Publication Data
US 2010/0285845 A1    Nov. 11, 2010

(30) Foreign Application Priority Data

Dec. 28, 2007    (JP) .................................. 2007-340604

(51) Int. Cl.
*H04B 1/38* (2006.01)
*H04M 1/00* (2006.01)
*G09G 5/00* (2006.01)

(52) U.S. Cl. ..................... 455/566; 455/90.3; 455/575.1; 379/424; 345/156

(58) Field of Classification Search .................. 455/567, 455/566, 41.3, 575.1, 90.3; 379/355.01, 379/424, 433.01, 433.06, 368; 345/156
See application file for complete search history.

(56) References Cited

U.S. PATENT DOCUMENTS

| 6,304,763 | B1 * | 10/2001 | Jahagirdar et al. ............. 455/566 |
| 2002/0045467 | A1 * | 4/2002 | Hama ............................ 455/567 |
| 2003/0083107 | A1 * | 5/2003 | Morishima .................... 455/566 |
| 2004/0204012 | A1 * | 10/2004 | Kakinuma ................... 455/550.1 |
| 2006/0171524 | A1 * | 8/2006 | Tsuchiya et al. .......... 379/355.01 |
| 2006/0172761 | A1 | 8/2006 | Im et al. |
| 2007/0173299 | A1 * | 7/2007 | Sawayama et al. ........ 455/575.1 |
| 2007/0298844 | A1 * | 12/2007 | Hamamura et al. ........... 455/566 |
| 2009/0143013 | A1 * | 6/2009 | Hatano et al. ................ 455/41.3 |

FOREIGN PATENT DOCUMENTS

JP    2002-044202    2/2002
(Continued)

OTHER PUBLICATIONS

Notice of Allowance issued dated Jul. 26, 2011 in counterpart Korean Patent Application No. 10-2010-7016762.

*Primary Examiner* — George Eng
*Assistant Examiner* — Nizar Sivji
(74) *Attorney, Agent, or Firm* — Procopio, Cory, Hargreaves & Savitch LLP

(57) ABSTRACT

In order to facilitate an operation for talking, a mobile communication terminal includes first and second LCDs which display images, the first LCD being changed in state between an open state where a display surface of the second LCD is exposed and a closed state where the display surface of the second LCD is covered by the first LCD, a state detecting portion which detects the open/closed state of the first LCD, a destination number accepting portion which accepts a telephone number of a call destination while the open state is being detected by the state detecting portion, and a communication control portion which originates a call to a telephone number accepted by the destination number accepting portion (S08) when the closed state is detected by the state detecting portion (YES in S07) after the telephone number has been accepted by the destination number accepting portion (S05).

5 Claims, 8 Drawing Sheets

FOREIGN PATENT DOCUMENTS

| | | |
|---|---|---|
| JP | 2002-368842 | 12/2002 |
| JP | 2004-260617 | 9/2004 |
| JP | 2007-267238 | 10/2007 |
| KR | 10-20050112461 A | 11/2005 |
| KR | 10-20060089303 A | 9/2006 |
| KR | 10-20070098520 A | 10/2007 |

* cited by examiner

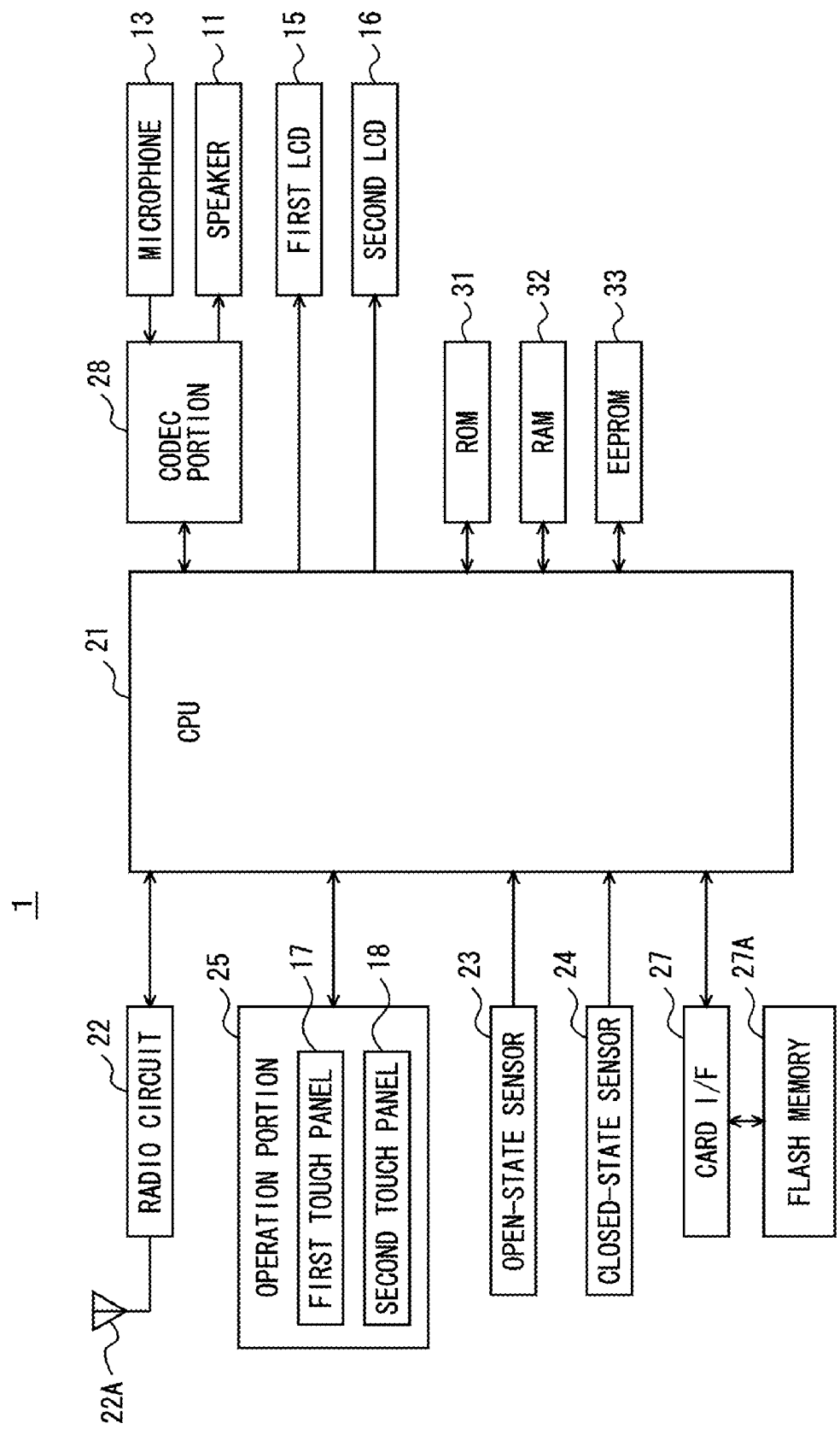

F I G. 6
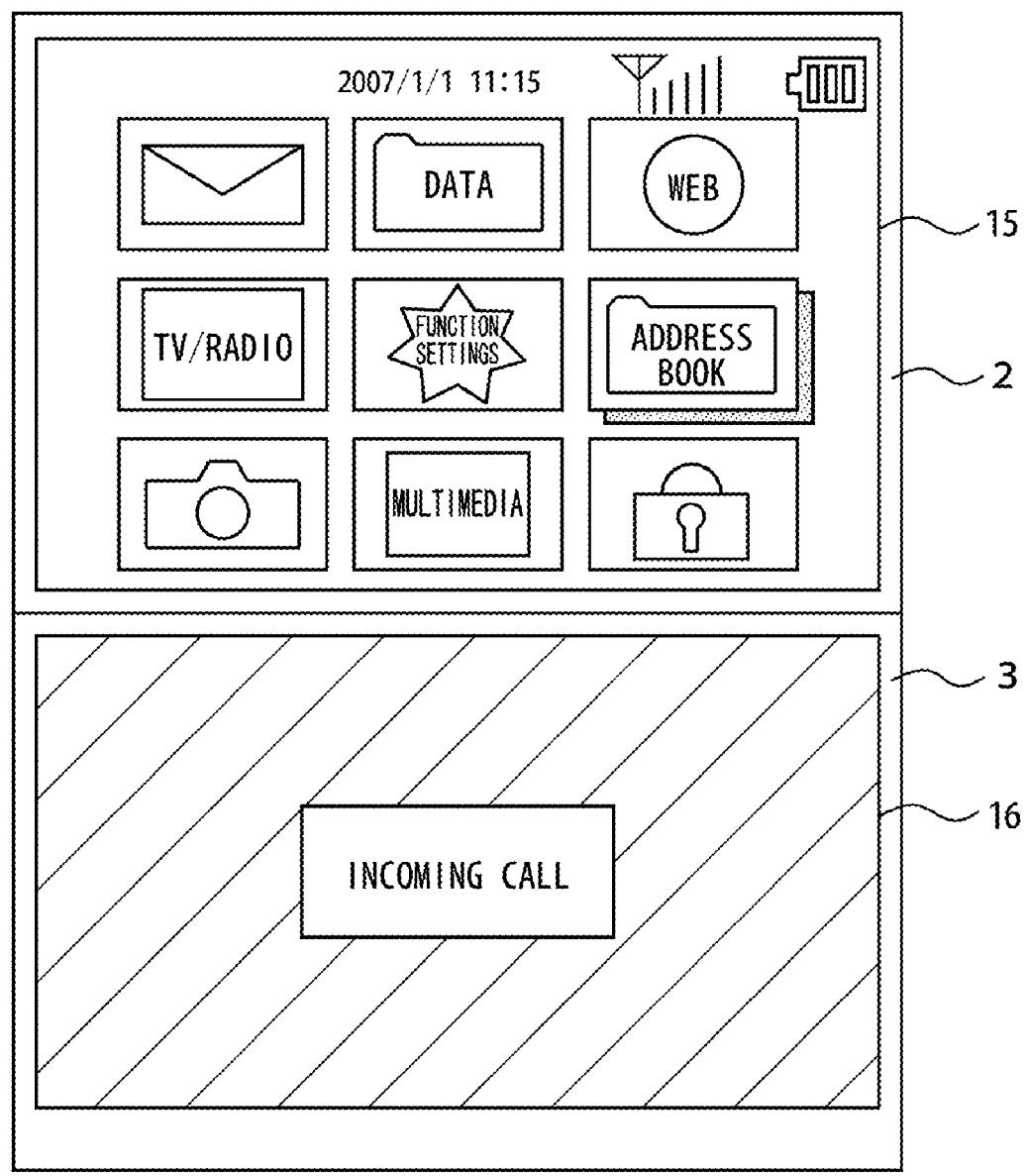

MOBILE COMMUNICATION TERMINAL

TECHNICAL FIELD

The present invention relates to a mobile communication terminal, and more particularly to a mobile communication terminal which can be opened and closed.

BACKGROUND ART

Recently, many mobile phones are configured to be changeable in style in consideration of convenience of use and portability. Taking advantage of such a change in style, a technique of using a user's operation of changing the style of the mobile phone as an instruction to be input into the mobile phone has been developed. There is known a mobile phone which is configured such that, when a phonebook is opened while the mobile phone is in the folded state and then the phone body is opened, a call is originated to the party designated in the phonebook to enter a talk mode. During the call, other applications can be browsed when the phone body is closed, and the talk can be continued when the phone body is opened again.

In the case of a mobile terminal focusing on manipulability of the keyboard as well as visibility of the display, the mobile terminal may increase in size to the extent that it cannot be held with one hand in the open state. This mobile phone takes a form suitable for talking when it is closed rather than when it is open. Thus, talking on the phone may be difficult if the mobile phone needs to be opened in order to originate a call to enter a talk mode.

DISCLOSURE OF THE INVENTION

Problems to be Solved by the Invention

The present invention has been accomplished to solve the above-described problem, and an object of the present invention is to provide a mobile communication terminal in which an operation for talking thereon is facilitated.

Means for Solving the Problems

To achieve the above-described object, according to an aspect of the present invention, a mobile communication terminal includes: first and second display portion to display images, the first display portion being changed in state between an open state where a display surface of the second display portion is exposed and a closed state where the display surface of the second display portion is covered by the first display portion; state detecting portion to detect the open/closed state of the first display portion; destination number accepting portion to accept a telephone number of a call destination in the state where the open state is being detected by the state detecting portion; and communication control portion, in response to an event that the closed state is detected by the state detecting portion after the telephone number has been accepted by the destination number accepting portion, for originating a call to the accepted telephone number.

According to another aspect of the present invention, a mobile communication terminal includes: first and second display portion to display images, the first display portion being changed in state between an open state where a display surface of the second display portion is exposed and a closed state where the display surface of the second display portion is covered by the first display portion; state detecting portion to detect the open/closed state of the first display portion; and communication control portion to cause the terminal to go off-hook in response to an event that the closed state is detected by the state detecting portion after an incoming call has been detected while the open state of the first display portion was being detected.

According to a further aspect of the present invention, a mobile communication terminal includes: display portion to display an image, the display portion being changed in state between an open state where a surface of an operation portion is exposed and a closed state where the surface of the operation portion is covered; state detecting portion to detect the open/closed state of the display portion; destination number accepting portion to accept a telephone number of a call destination in the state where the open state is being detected by the state detecting portion; and communication control portion, in response to an event that the closed state is detected by the state detecting portion after the telephone number has been accepted by the destination number accepting portion, for originating a call to the accepted telephone number.

According to yet another aspect of the present invention, a mobile communication terminal includes: display portion to display an image, the display portion being changed in state between an open state where a surface of an operation portion is exposed and a closed state where the surface of the operation portion is covered; state detecting portion to detect the open/closed state of the display portion; and communication control portion to cause the terminal to go off-hook in response to an event that the closed state is detected by the state detecting portion after an incoming call has been detected while the open state was being detected by the state detecting portion.

BRIEF DESCRIPTION OF THE DRAWINGS

FIG. 2 is a functional block diagram schematically showing the hardware configuration of the mobile communication terminal.

FIG. 6 shows an example of an incoming call alert screen.

BEST MODES FOR CARRYING OUT THE INVENTION

Figure 1A:
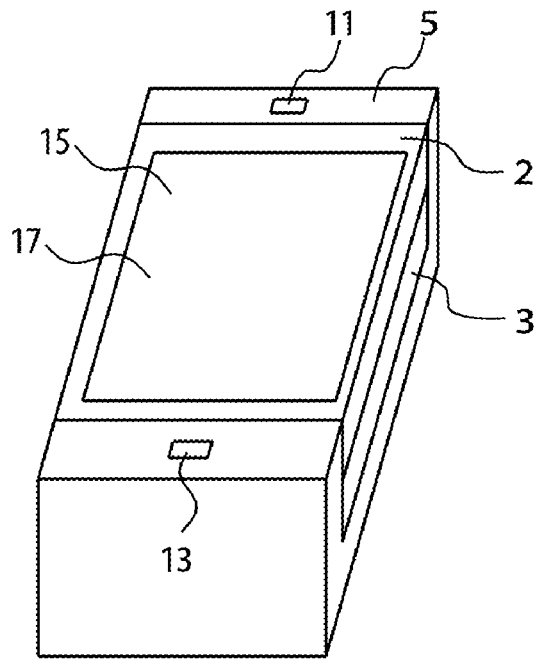
FIG. 1A is a perspective view of a mobile communication terminal in a closed state.

Embodiments of the present invention will now be described with reference to the drawings. In the following description, like reference characters denote like parts, which have like names and functions, and therefore, detailed description thereof will not be repeated.

Figure 1B:
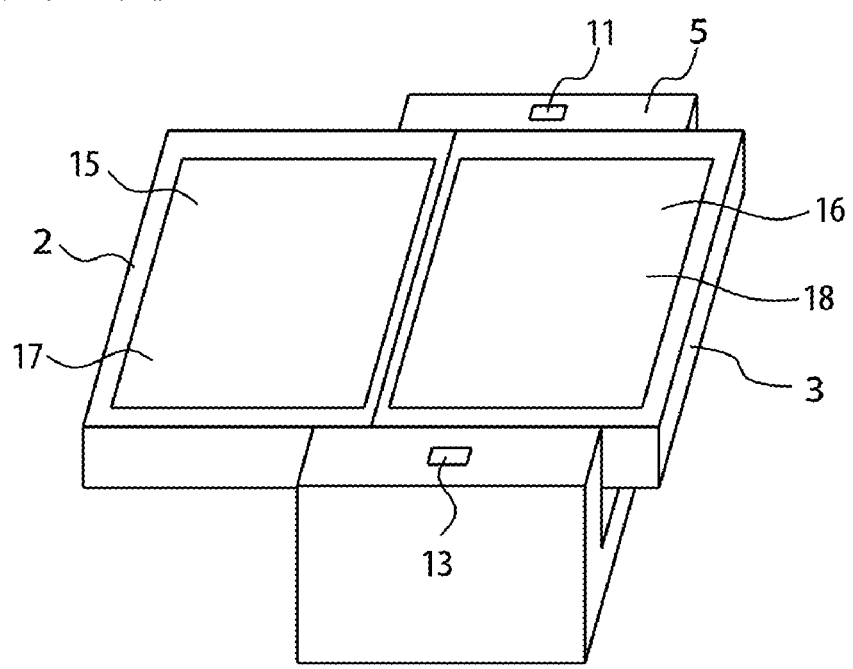
FIG. 1B is a perspective view of the mobile communication terminal in an open state.

A mobile communication terminal 1 according to the present embodiment is changed in style between an open state and a closed state. FIG. 1A is a perspective view of the mobile communication terminal in the closed state. FIG. 1B is a perspective view of the mobile communication terminal in the open state. Referring to FIGS. 1A and 1B, mobile communication terminal 1 includes a first display portion 2, a second display portion 3, and a housing portion 5 which supports first display portion 2 and second display portion 3 in a slidable manner. First display portion 2 and second display portion 3 each have an approximately rectangular parallelepiped shape. Housing portion 5 has a recess, in which first display portion 2 and second display portion 3 are housed when mobile communication terminal 1 is in the closed state, so that mobile communication terminal 1 attains an approximately rectangular parallelepiped shape. As such, mobile communication terminal 1 in the closed state has a shape suitable for talking thereon.

A speaker 11 and a microphone 13 are each arranged at a position on housing portion 5 that is other than the recess for receiving first display portion 2 and second display portion 3. Therefore, speaker 11 and microphone 13 are exposed when mobile communication terminal 1 is in the closed state.

In the closed state, first display portion 2 lies on second display portion 3. First display portion 2 includes a first liquid crystal display (LCD) 15 on its surface opposite from its other surface facing second display portion 3, and a first touch panel 17 is provided overlaid on first LCD 15. Second display portion 3 includes a second LCD 16 on its surface facing first display portion 2, and a second touch panel 18 is provided overlaid on second LCD 16.

As first display portion 2 lies on second display portion 3 in the closed state, first LCD 15 is exposed, whereas second LCD 16 is covered by first display portion 2. Thus, when mobile communication terminal 1 is in the closed state, a user can touch first touch panel 17 but cannot touch second touch panel 18.

In the state where mobile communication terminal 1 is closed, when first display portion 2 and second display portion 3 both slide, mobile communication terminal 1 attains the open state. Second display portion 3 slides in a direction opposite from the direction in which first display portion 2 slides. Second display portion 3 is biased by a spring provided in housing portion 5, so that second display portion 3 is moved upward when it slides to a predetermined position. Thus, at the time when mobile communication terminal 1 is in the open state, as shown in FIG. 1B, the display surface of first LCD 15 included in first display portion 2 and the display surface of second LCD 16 included in second display portion 3 become flush with each other. Accordingly, when mobile communication terminal 1 is in the open state, first LCD 15 and second LCD 16 are both exposed, allowing the user to look at the images displayed thereon. The screen area doubles as compared with the case where mobile communication terminal 1 is in the closed state, so that a large amount of information can be displayed. Furthermore, first touch panel 17 overlaid on first LCD 15 and second touch panel 18 overlaid on second LCD 16 are exposed as well, allowing the user to input instructions using a large area.

When mobile communication terminal 1 is in the open state, speaker 11 and microphone 13 are both exposed, enabling talking over the terminal. However, first display portion 2 and second display portion 3 protrude from housing portion 5, and the display surface doubles that in the closed state, making it difficult for the user to talk while holding the terminal with the hand. The open state of mobile communication terminal 1 is suitable for displaying images and for the user to input operations.

FIG. 2 is a functional block diagram schematically showing the hardware configuration of the mobile communication terminal Referring to FIG. 2, mobile communication terminal 1 includes: a CPU 21 which is responsible for overall control of mobile communication terminal 1; first LCD 15 and second LCD 16 each connected to CPU 21; a radio circuit 22 connected to an antenna 22A; an open-state sensor 23; a closed-state sensor 24, an operation portion 25 which accepts an input of a user operation; a card interface (I/F) 27; a codec portion 28; speaker 11 and microphone 13 connected to codec portion 28; a read only memory (ROM) 31 for storing a program to be executed by CPU 21 and others; a random access memory (RAM) 32 used as a work area for CPU 21; and an electronically erasable and programmable ROM (EE-PROM) 33 which stores address book data and others in a non-volatile manner.

Radio circuit 22 is supplied with a radio signal which has been received by antenna 22A. Radio circuit 22 demodulates the radio signal, and outputs the resultant signal to CPU 21. In the case where the demodulated radio signal is an audio signal, CPU 21 outputs the audio signal to codec portion 28. When radio circuit 22 receives a signal from CPU 21, it modulates the signal, and outputs the modulated radio signal to antenna 22A. CPU 21, on receipt of an audio signal from codec portion 28, outputs the audio signal to radio circuit 22. When radio circuit 22 receives an incoming call, it outputs an incoming call signal to CPU 21. When receiving an outgoing call signal from CPU 21, radio circuit 22 calls a telephone number input from CPU 21.

Codec portion 28 decodes an audio signal input from CPU 21, converts the decoded digital audio signal to an analog signal, amplifies the same, and outputs the resultant signal to speaker 11 which serves as a receiver. When receiving an analog audio signal from microphone 13, codec portion 28 converts the audio signal into a digital signal, codes the same, and outputs the coded audio signal to CPU 21.

Open-state sensor 23 is ON when mobile communication terminal 1 is in the open state, and OFF when it is not in the open state. Closed-state sensor 24 is ON when mobile communication terminal 1 is in the closed state, and OFF when it is not in the closed state. Open-state sensor 23 and closed-state sensor 24 are connected to CPU 21, and CPU 21 detects the style of mobile communication terminal 1 by detecting the states of open-state sensor 23 and closed-state sensor 24. Here, open-state sensor 23 and closed-state sensor 24 both detect the position of first display portion 2.

Operation portion 25 includes first touch panel 17 and second touch panel 18. When an operation is input from operation portion 25, CPU 21 performs processing in accordance with the input operation. CPU 21 reads a plurality of application programs stored in ROM 31 for execution. While these application programs are written in a program language such as C or JAVA (registered trademark), the program languages used for writing the application programs are not restricted thereto; any other program languages may be used. Further, while the plurality of application programs are stored in ROM 31 and loaded into mobile communication terminal 1, the plurality of application programs may be written in a single program language, or in different program languages. That is, there may be a plurality of application programs written in different program languages.

First LCD 15 and second LCD 16 are controlled by CPU 21 to display images. It is noted that first LCD 15 and second LCD 16 may each be replaced with any device for displaying an image, which may be for example an organic electroluminescence (EL) display. First touch panel 17 and second touch panel 18 each detect a position touched by a user when the user touches the panel surface with the finger or the like.

First touch panel 17 and second touch panel 18 each output positional information indicating the detected position to CPU 21.

EEPROM 33 stores address book data. In the address book data, for each user as a call destination, user identification information for identifying the user is associated with related information. The user identification information includes the user's full name, nickname or other short name, and face image obtained by picking up an image of the user's face. The related information includes a telephone number, e-mail address, group to which the user belongs, and memo.

Card I/F 27 is mounted with a removable memory card 27A. Memory card 27A may be, e.g., a CompactFlash, SmartMedia (registered trademark), secure digital (SD) memory card, memory stick, multimedia card (MMC), xD picture card, or the like.

CPU 21 is capable of accessing memory card 27A via card I/F 27. While it is here assumed that the program to be executed by CPU 21 is stored in flash ROM 31, the program may be stored in memory card 27A and read from memory card 27A for execution by CPU 21. The recording medium for storing the program is not restricted to memory card 27A. It may be a flexible disk, a cassette tape, a magnetic disk, an optical disk (compact disc-ROM (CD-ROM), magnetic optical disc (MO), mini disc (MD), digital versatile disc (DVD)), an optical card, or a semiconductor memory such as a mask ROM, an EPROM, or the like. Still alternatively, mobile communication terminal 1 may be connected to the Internet via radio circuit 22 and the program may be downloaded from a computer connected to the Internet, to be executed by CPU 21. As used herein, the "program" includes, not only the program directly executable by CPU 21, but also a source program, a compressed program, an encrypted program, and others.

Figure 3:
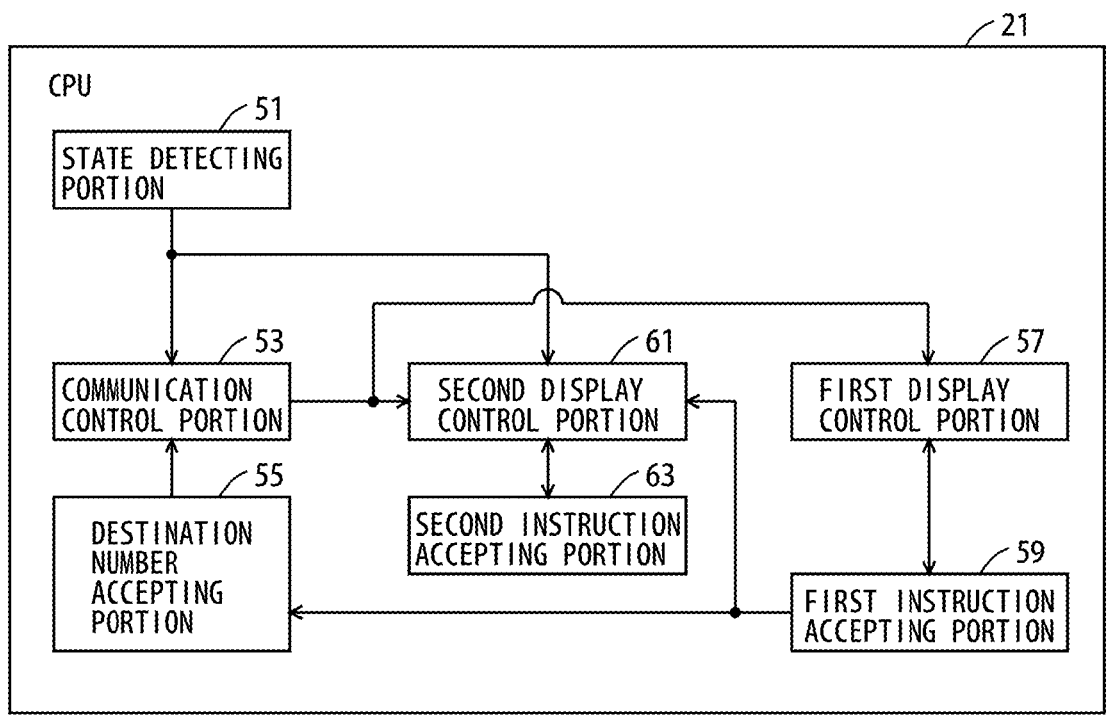
FIG. 3 is a functional block diagram schematically showing the functions of a CPU included in the mobile communication terminal.

FIG. 3 is a functional block diagram schematically showing the functions of the CPU included in the mobile communication terminal. CPU 21 includes: a state detecting portion 51 which detects the state of mobile communication terminal 1; a communication control portion 53 which controls radio circuit 22; a destination number accepting portion 55 which accepts a destination to be called; a first display control portion 57 which controls first LCD 15; a first instruction accepting portion 59 connected to the first touch panel; a second display control portion 61 which controls second LCD 16; and a second instruction accepting portion 63 connected to the second touch panel.

State detecting portion 51 detects the state of mobile communication terminal 1. State detecting portion 51 detects the open state when open-state sensor 23 is ON. State detecting portion 51 detects the closed state when closed-state sensor 24 is ON. When open-state sensor 23 and closed-state sensor 24 are both OFF, state detecting portion 51 detects a state that is neither the closed state nor the open state. State detecting portion 51 outputs a state signal indicating the detected state of mobile communication terminal 1 to communication control portion 53 and second display control portion 61.

First display control portion 57 controls first LCD 15 to display an image on first LCD 15. First display control portion 57 outputs the image displayed on first LCD 15 to first instruction accepting portion 59.

First instruction accepting portion 59 is connected to first touch panel 17, and accepts from first touch panel 17 a position signal which indicates the position on the first touch panel touched by a person with the finger or the like. First instruction accepting portion 59 detects a command assigned to a predetermined position on the image in accordance with the image input from first display control portion 57 and the position signal input from first touch panel 17.

Second display control portion 61 controls second LCD 16 to display an image on second LCD 16. Second display control portion 61 outputs the image displayed on second LCD 16 to second instruction accepting portion 63. Second display control portion 61 switches the image to be displayed on second LCD 16 in accordance with a command output from first instruction accepting portion 59. This allows an image associated with the image being displayed on first LCD 15 to be displayed on second LCD 16.

Second instruction accepting portion 63 is connected to second touch panel 18, and accepts from second touch panel 18 a position signal which indicates the position on the first touch panel touched by a person with the finger or the like. Second instruction accepting portion 63 detects a command assigned to a predetermined position on the image in accordance with the image input from second display control portion 61 and the position signal input from second touch panel 18.

An example of displaying, on second LCD 16, an image associated with the image being displayed on first LCD 15 will now be described in conjunction with the case where a user uses an address book to originate a call. When first instruction accepting portion 59 or second instruction accepting portion 63 accepts an instruction to display an address book, first display control portion 57 reads address book data stored in EEPROM 33 and displays images of a plurality of pieces of user identification information included in the address book data on first LCD 15. In this state, when the user designates one of the plurality of images of user identification information displayed on first LCD 15 with the finger, first instruction accepting portion 59 specifies the user identification information from the image being displayed in the designated position, and outputs the user identification information to second display control portion 61 and destination number accepting portion 55.

Second display control portion 61, on receipt of the user identification information from first instruction accepting portion 59, searches the address book data stored in EEPROM 33 and causes second LCD 16 to display an image of related information that is associated with the user identification information. The related information includes the name, group, telephone number, e-mail address, memo, and others included in the address book data.

Figure 4:
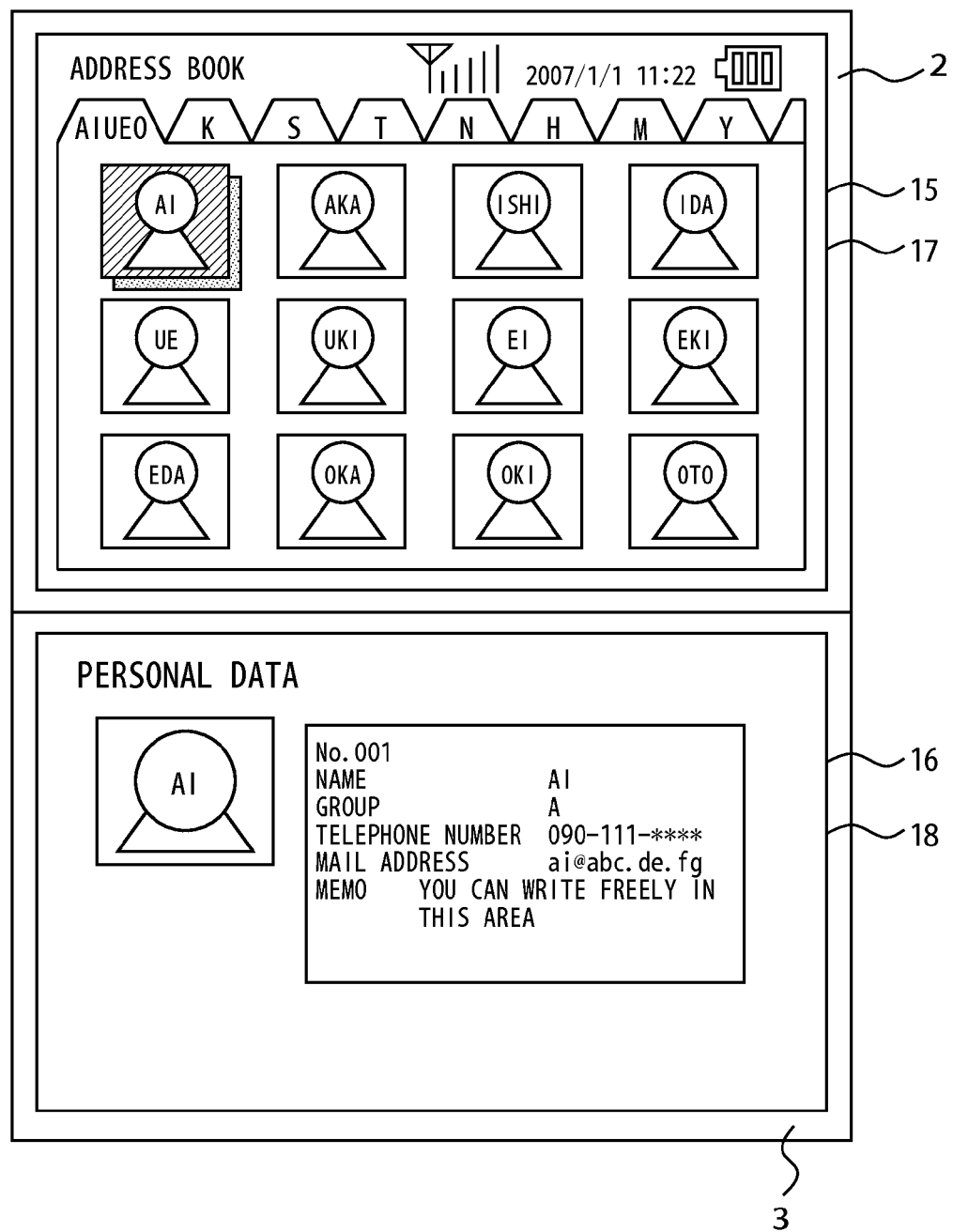
FIG. 4 shows an example of an address book display screen which is displayed during a call originating operation.

FIG. 4 shows an example of an address book display screen which is displayed during a call originating operation. Referring to FIG. 4, a list screen is displayed on first LCD 15 provided in first display portion 2, and a related screen including the related information is displayed on second LCD 16 provided in second display portion 3.

The list screen displayed on first LCD 15 includes images of the plurality of pieces of user identification information included in the address book data, which images are laid out systematically. Here, the user identification information includes the user name and face image.

The related screen displayed on second LCD 16 includes related information which is associated by the address book data with the user identification information selected in the list screen. The related screen shown here is displayed when the user designates the name "Al" as the user identification information. In the list screen, the image of the user identification information designated by the user is displayed brighter than the other images, to make it distinguishable from the images of the other user identification information.

While it is here assumed that the information included in the address book data is displayed as the related information, in the case where EEPROM 33 stores therein transmitted and received e-mails as well as annual, monthly, and daily schedule data, then the related information may include the e-mail transmitted to or received from the user corresponding to the user identification information input from first instruction accepting portion 59, and the schedule data including the user identification information of that user. The related information displayed on second LCD 16 allows the user, before originating a call, to confirm the information that has been lately exchanged with the intended party, or to confirm the past or future schedule.

Returning to FIG. 3, destination number accepting portion 55, on receipt of the user identification information from first instruction accepting portion 59, searches the address book data stored in EEPROM 33, and outputs the telephone number associated with the user identification information, to communication control portion 53.

Communication control portion 53 controls radio circuit 22. Communication control portion 53 receives a state signal indicating the state of mobile communication terminal 1 from state detecting portion 51, and receives a telephone number of a call destination from destination number accepting portion 55. In the state where a state signal indicating the open state is being input, when a telephone number of a call destination is input from destination number accepting portion 55 and then a state signal indicating the closed state is received, communication control portion 11 causes radio circuit 22 to originate a call to the destination number received from destination number accepting portion 55 and to connect the line when there is an answer from the call destination. Communication control portion 53 outputs to first display control portion 57 communication state signals indicating the communication states from when communication control portion 53 causes radio circuit 22 to originate a call till when the line is disconnected.

First display control portion 57, on receipt of a communication state signal from radio circuit 22, displays a screen indicating the communication state on first LCD 15. The screen indicating the communication state includes: a calling screen which is displayed on first LCD 15 during calling, from when communication control portion 53 originates a call till when an answer is received from the call destination; and an active call screen which indicates that the line has been connected and the call is active.

Figure 5:
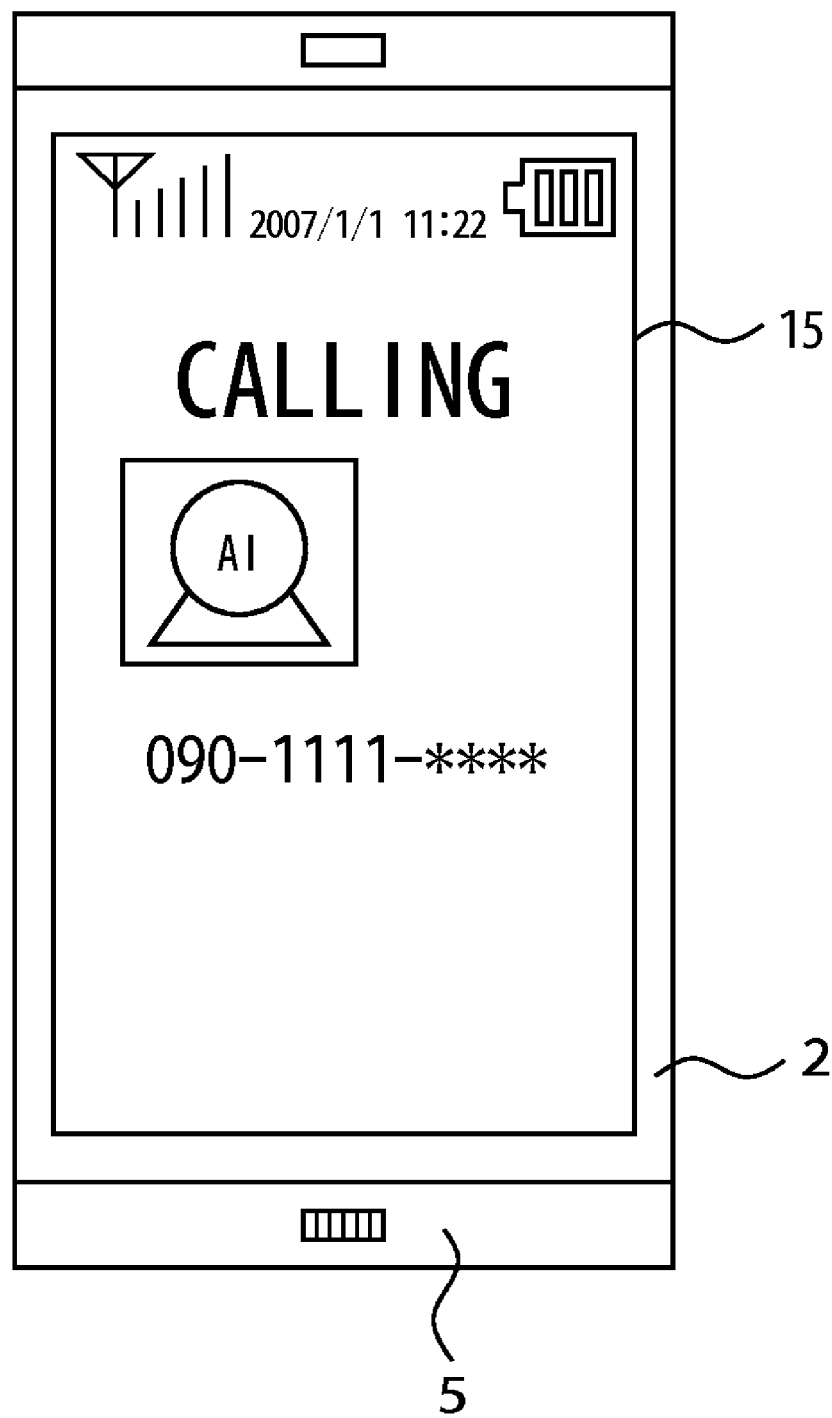
FIG. 5 shows an example of a calling screen.

FIG. 5 shows an example of the calling screen. The calling screen is displayed when mobile communication terminal 1 is in the closed state. Referring to FIG. 5, the calling screen includes a message "calling" for notifying the user that the call is being originated, the name and face image as the user identification information of the call destination, and the telephone number. This allows the user to know that mobile communication terminal 1 is calling the user named "Al".

Returning to FIG. 3, in the case where radio circuit 22 receives an incoming call while the state signal indicating the open state is being input from state detecting portion 51, communication control portion 53 outputs to second display control portion 61 an incoming call signal indicating that there is an incoming call. Thereafter, when the state signal indicating the closed state is input, communication control portion 53 causes radio circuit 22 to take the terminal off-hook, so as to connect the line.

On the other hand, in the case where an incoming call signal is input from communication control portion 53 while in the open state, second display control portion 61 displays on second LCD 16 an incoming call alert screen for notifying the user that there is an incoming call. In the open state, an image may have already been displayed on second LCD 16, in which case second display control portion 61 displays the incoming call alert screen in preference to the image that has been displayed. For example, the incoming call alert screen may be displayed overlaid on the image being displayed. In this case, the incoming call alert screen is preferably displayed in such a manner that the underlying image can be seen through the incoming call alert screen. Alternatively, the image that has been displayed may be replaced with the incoming call alert screen.

FIG. 6 shows an example of the incoming call alert screen. Referring to FIG. 6, a menu screen is displayed on first LCD 15, while a video image of television broadcast is displayed on second LCD 16. The menu screen is a screen for a user to select an application program. On second LCD 16, the incoming call alert screen including the message "incoming call" is displayed overlaid on the video image of the television broadcast.

Figure 7:
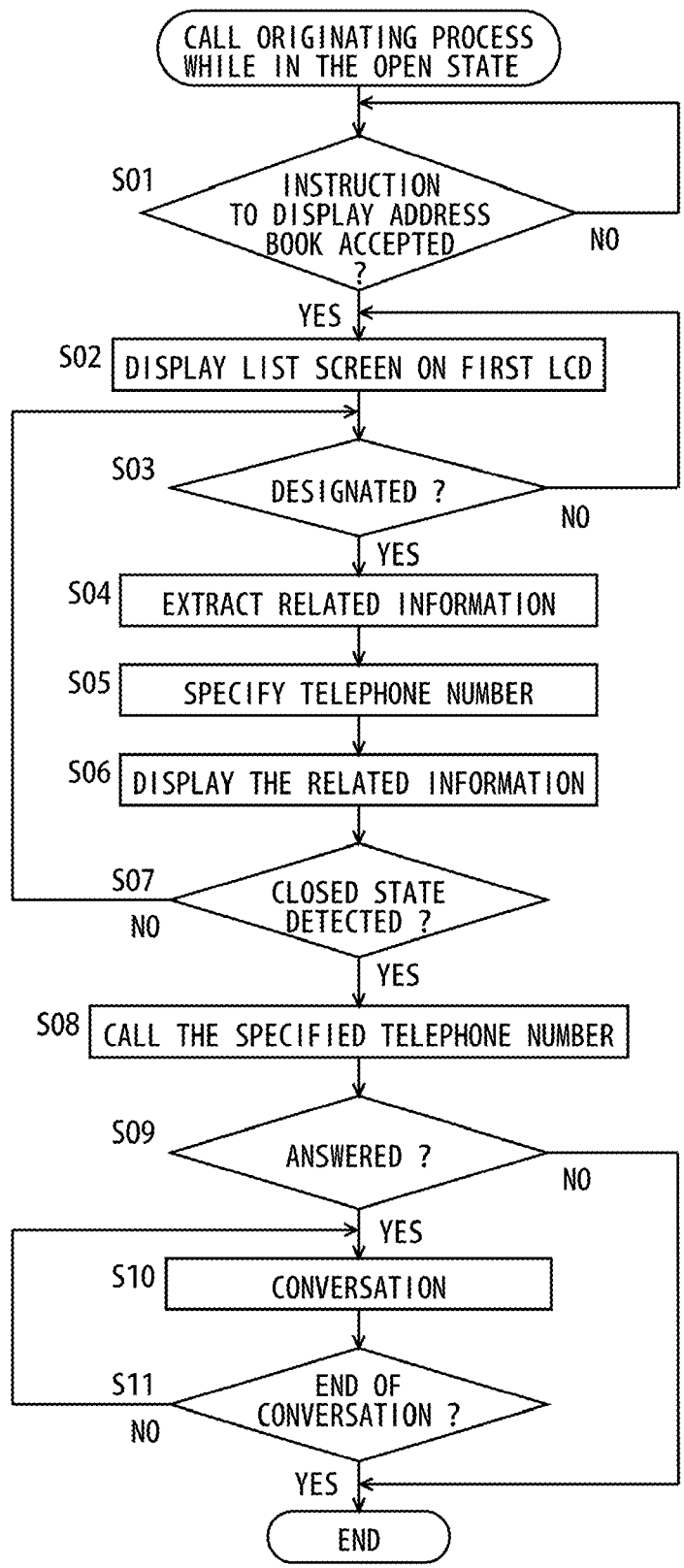
FIG. 7 is a flowchart illustrating an example of the flow of a call originating process performed while in the open state.

FIG. 7 is a flowchart illustrating an example of the flow of a call originating process performed while in the open state. The call originating process is carried out by CPU 21 included in mobile communication terminal 1, when mobile communication terminal 1 is in the open state, as CPU 21 executes a communication program. Referring to FIG. 7, CPU 21 determines whether an operation of instructing display of an address book has been accepted (step S01). CPU 21 is in a standby mode until an operation of instructing display of the address book is accepted (NO in step S01), and once the operation of instructing display of the address book is accepted (YES in step S01), the process proceeds to step S02. On the menu screen displayed on first LCD 15, when the user touches an icon associated with the operation of instructing display of the address book with the finger, the operation of instructing display of the address book is accepted from first touch panel 17.

In step S02, the list screen, as shown in FIG. 4, is displayed on first LCD 15. It is then determined whether one of the images of the plurality of pieces of user identification information included in the list screen has been designated (step S03). The positions of the images of the plurality of pieces of user identification information displayed on first LCD 15 and the positional information input from first touch panel 17 are used to determine which one of the images of the user identification information has been designated. In the case where one of the images of the plurality of pieces of user identification information has been designated, the process proceeds to step S04; otherwise, the process returns to step S02.

In step S04, related information that is related to the designated user identification information is extracted. The address book data stored in EEPROM 33 are searched to specify the address book data including the designated user identification information, and the related information included in the specified address book data is extracted. Here, the related information includes the telephone number, e-mail address, group to which the intended user belongs, and memo.

In step S05, the telephone number included in the related information extracted in step S04 is extracted so as to specify the telephone number for calling. The related information extracted in step S04 is displayed on second LCD 16 (step S06). This allows the user, prior to calling, to confirm the related information about the user as a call destination. Furthermore, in the state where the list screen is being displayed on first LCD 15, the related information that is related to the user identification information selected from that list screen is displayed on second LCD 16, allowing the user to readily select the call destination.

In step S07, it is determined whether the closed state has been detected as the state of mobile communication terminal 1. In other words, it is determined whether the state of mobile communication terminal 1 has been changed from the open state to the closed state. Specifically, it is determined whether closed-state sensor 24 has changed from OFF to ON. If the closed state has been detected, the process proceeds to step S08; otherwise, the process returns to step S03. That is, the user can select a user as the call destination until when mobile communication terminal 1 attains the closed state.

In step S08, a call is originated to the telephone number specified in step S05. It is then determined whether an answer has been received from the phone of the call destination (step S09). If the answer has been received, the process proceeds to step S10; otherwise, the process is terminated.

In step S10, the line is connected to start conversation. The call is continued until an end of conversation (NO in step S11), and once the conversation is over (YES in step S11), the process is terminated. The end of conversation is detected when the line is disconnected or when the user inputs into first touch panel 17 an operation of instructing the end of conversation.

Figure 8:
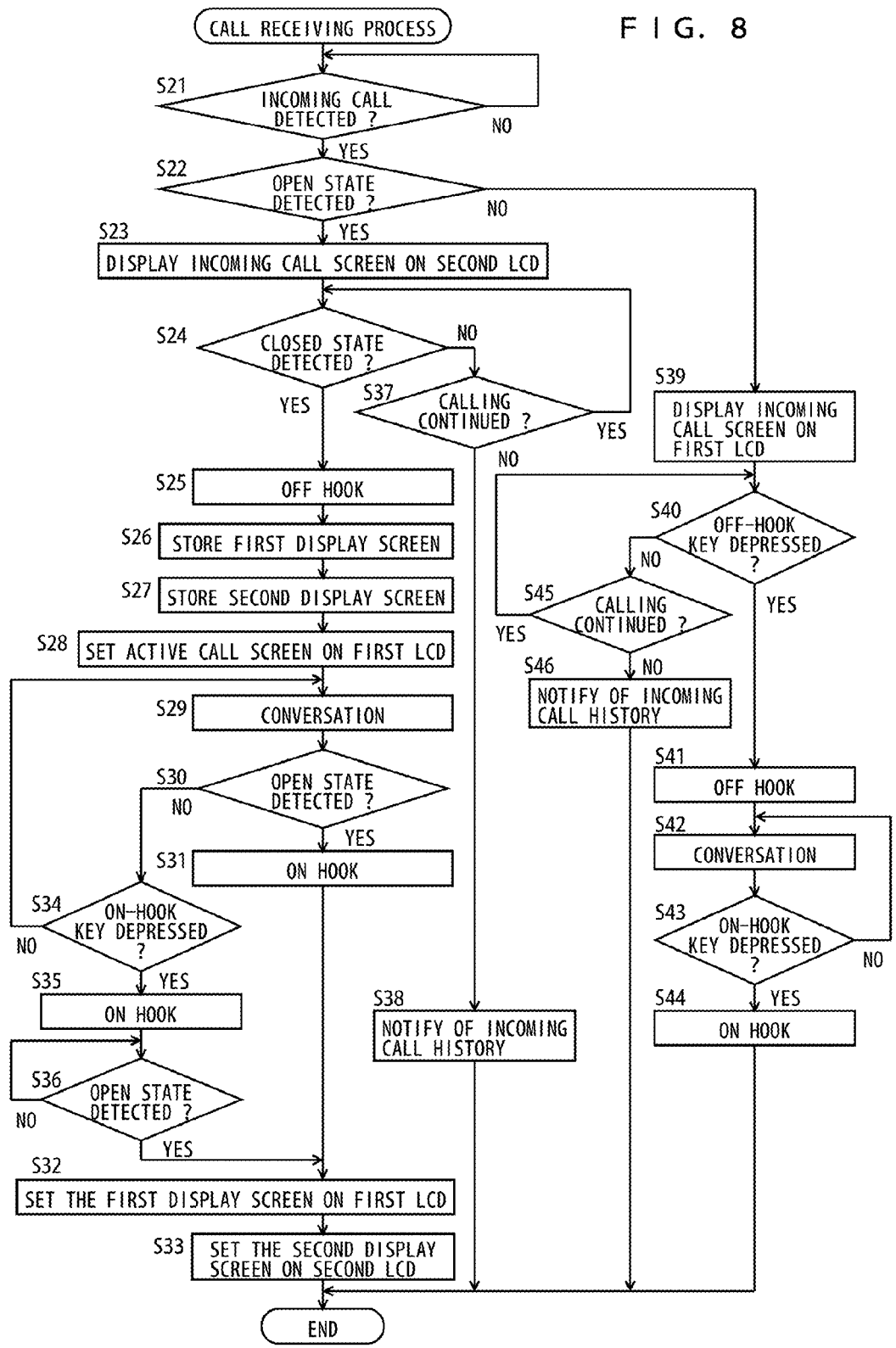
FIG. 8 is a flowchart illustrating an example of the flow of a call receiving process.

FIG. 8 is a flowchart illustrating an example of the flow of a call receiving process. The call receiving process is carried out by CPU 21 included in mobile communication terminal 1 as CPU 21 executes the communication program. Referring to FIG. 8, CPU 21 determines whether an incoming call has been detected (step S21). The incoming call is detected when radio circuit 22 receives an incoming call. CPU 21 is in a standby mode until an incoming call is detected (NO in step S21). Once the incoming call is detected (YES in step S21), the process proceeds to step S22.

In step S22, it is determined whether the open state has been detected as the state of mobile communication terminal 1. In other words, the state of mobile communication terminal 1 upon reception of the incoming call is determined. Specifically, the open state is detected when open-state sensor 23 is ON, while the closed state is detected when closed-state sensor 24 is ON. If the open state has been detected, the process proceeds to step S23; otherwise, the process proceeds to step S39.

In step S23, an incoming call alert screen is displayed on second LCD 16. The incoming call alert screen includes the message "incoming call". The incoming call alert screen is displayed in preference to the image that has already been displayed. This ensures that the user is notified of the incoming call. The message is displayed superimposed on the already displayed image. In this case, the incoming call alert screen is preferably displayed in such a manner that the underlying image can be seen through the incoming call alert screen. While it is here assumed that the incoming call alert screen is displayed on second LCD 16, it may be displayed on first LCD 15, or on both first LCD 15 and second LCD 16. Furthermore, in addition to the display of the incoming call screen, sound, vibration, light, or a combination thereof may be used for notifying of an incoming call.

In step S24, it is determined whether the closed state has been detected as the state of mobile communication terminal 1. In other words, it is determined whether the state of mobile communication terminal 1 has been changed from the open state to the closed state. Specifically, it is determined whether closed-state sensor 24 has changed from OFF to ON. If the closed state has been detected, the process proceeds to step S25; otherwise, the process proceeds to step S37.

In step S37, it is determined whether the calling is continued. If radio circuit 22 is receiving the incoming call, it is determined that the calling is continued. If the calling is continued, the process returns to step 24; otherwise, the process proceeds to step 38. That is, while radio circuit 22 is receiving the incoming call, the process waits until mobile communication terminal 1 attains the closed state. Once mobile communication terminal 1 attains the closed state, the process proceeds to step S25.

In step S38, a screen notifying of incoming call history is displayed on second LCD 16, and the process is terminated. The screen notifying of the incoming call history includes the message "incoming call" and the caller's telephone number. This can reliably notify the user that there was a call. While it is here assumed that the screen notifying of the incoming call history is displayed on second LCD 16, it may be displayed on first LCD 15, or on both first LCD 15 and second LCD 16. Furthermore, in addition to the display of the screen notifying of the incoming call history, light or the like may be used to notify that there was a call.

In step S25, radio circuit 22 is caused to take the terminal off-hook. As a result, the line is connected to enable conversation. In the following step S26, a first display screen being displayed on first LCD 15 is stored in EEPROM 33, and in the following step S27, a second display screen being displayed on second LCD 16 is stored in EEPROM 33. Then, in step S28, a calling screen is displayed on first LCD 15. This allows the user to know that mobile communication terminal 1 has moved to the active call state where the user can talk on the terminal.

A conversation process is then performed over the connected line (step S29). In the case where there is an incoming call while mobile communication terminal 1 is in the open state, the user only needs to perform an operation of changing the state of mobile communication terminal 1 to the closed state so as to respond to the incoming call to start conversation. This facilitates the operation of answering the incoming call.

In step S30, it is determined whether the open state has been detected as the state of mobile communication terminal 1. In other words, it is determined whether the state of mobile communication terminal 1 has been changed from the closed state to the open state. Specifically, it is determined whether open-state sensor 23 has changed from OFF to ON. If the open state has been detected, the process proceeds to step S31; otherwise, the process proceeds to step S34.

In step S34, it is determined whether an on-hook key has been depressed. If the on-hook key has been depressed, the process proceeds to step S35; otherwise, the process returns to step S29. The on-hook key may be a hard key arranged on housing portion 5, or a soft key displayed on first LCD 15.

That is, the call is continued until when the state of mobile communication terminal 1 is changed to the open state or until when the on-hook key is depressed. In the case where the other party has disconnected the line during the call, the process may proceed to step S35, as in the case where the off-hook key has been depressed in step S34.

In step S31, the terminal goes on-hook. Specifically, radio circuit 22 is caused to disconnect the line that has been connected for telephone conversation. The terminal goes on-hook when mobile communication terminal 1 that was in the closed state during the call is changed to the open state. This allows the user to end the call with a simple operation of changing the state of mobile communication terminal 1 from the closed state to the open state.

In step S32, the first display screen stored in EEPROM 33 in step S26 is displayed on first LCD 15, and in the following step S33, the second display screen stored in EEPROM 33 in step S27 is displayed on second LCD 16. The process is then terminated. In this manner, the screens that were being displayed on first LCD 15 and second LCD 16 before the call are displayed again, allowing the user to resume the job that the user was doing before the call.

If it is determined in step S34 that the on-hook key has been depressed, in step S35, the terminal goes on-hook. Specifically, radio circuit 22 is caused to disconnect the line that has been connected for telephone conversation. The user can end the call by depressing the on-hook key, without the need of changing the state of mobile communication terminal 1 from the closed state to the open state.

In step S36, it is determined whether the open state has been detected as the state of mobile communication terminal 1. In other words, it is determined whether the state of mobile communication terminal 1 has been changed from the closed state to the open state. Specifically, it is determined whether open-state sensor 23 has changed from OFF to ON. The process waits until the open state is detected (NO in step S36), and once the open state is detected (YES in step S36), the process proceeds to step S32.

On the other hand, if mobile communication terminal 1 is in the closed state upon detection of an incoming call in step S21 (NO in step S22), in step S39, an incoming call alert screen is displayed on first LCD 15. The incoming call alert screen includes the message "incoming call" and the caller's telephone number.

In the following step S40, it is determined whether an off-hook key has been depressed. If the off-hook key has been depressed, the process proceeds to step S41; otherwise, the process proceeds to step S45. The off-hook key may be a hard key arranged on housing portion 5, or a soft key displayed on first LCD 15. That is, while radio circuit 22 is receiving an incoming call, the process waits until the off-hook key is depressed, and the process proceeds to step S41 when the off-hook key is depressed.

In step S45, it is determined whether the calling is continued. If the calling is continued, the process returns to step S40; otherwise, the process proceeds to step S46. In step S46, as in step S38, the screen notifying of the incoming call history is displayed on first LCD 15, and the process is terminated.

In step S41, radio circuit 22 is caused to take the terminal off-hook. As a result, the line is connected to enable conversation. A conversation process is performed over the connected line (step S42). When the off-hook key is depressed, the terminal goes off-hook, even though the state of mobile communication terminal 1 is not changed from the open state to the closed state, so that the conversation can be started.

In step S43, it is determined whether the on-hook key has been depressed. If the on-hook key has been depressed, the process proceeds to step S44; otherwise, the process returns to step S42. In the case where the other party has disconnected the line during the call, the process may proceed to step S44, as in the case where the on-hook key has been depressed in step S43. In the following step S44, the terminal goes on-hook. Specifically, radio circuit 22 is caused to disconnect the line that has been connected for the telephone conversation, and the process is terminated.

For example in the case where there is an incoming call while the user is causing mobile communication terminal 1 to execute an application program, the user may change mobile communication terminal 1 to the closed state so as to start the conversation. After an end of the conversation, when the user performs an operation of changing the state of mobile communication terminal 1 to the open state, the screens that were being displayed on first LCD 15 and second LCD 16 before the call are displayed on first LCD 15 and second LCD 16, respectively. This allows the user to resume the suspended application program.

As described above, according to mobile communication terminal 1 of the present embodiment, in the case where a telephone number of a call destination is accepted while the open state is being detected and when the closed state is detected after the telephone number has been accepted, a call is originated to the accepted telephone number. This allows the user to originate a call with a simple operation of changing the state of mobile communication terminal 1 from the open state to the closed state.

In the open state, mobile communication terminal 1 displays on second LCD 16 the related information that is related to the user identification information that has been selected from the list screen of the user identification information displayed on first LCD 15. This facilitates selection of the call destination.

When an incoming call is detected in the open state, mobile communication terminal 1 goes off-hook in response to an event that the closed state is detected. This allows the user to take the terminal off-hook with a simple operation of changing its state from the open state to the closed state.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A mobile communication terminal comprising:
    first and second display portion to display images, said first display portion being changed in state between an open state where a display surface of said second display portion is exposed and a closed state where the display surface of said second display portion is covered by said first display portion;
    state detecting portion to detect the open/closed state of said first display portion; and
    communication control portion to cause the terminal to go off-hook in response to an event that said closed state is detected by said state detecting portion after an incoming call has been detected while said open state was being detected by said state detecting portion.

2. A mobile communication terminal comprising:
    display portion to display an image, said display portion being changed in state between an open state where a surface of an operation portion is exposed and a closed state where the surface of said operation portion is covered by said display portion;
    state detecting portion to detect the open/closed state of said display portion; and
    communication control portion to cause the terminal to go off-hook in response to an event that said closed state is detected by said state detecting portion after an incoming call has been detected while said open state was being detected by said state detecting portion.

3. The mobile communication terminal of claim 1, further comprising a microphone that is exposed externally when the first display portion is in said closed state.

4. The mobile communication terminal of claim 2, further comprising a microphone that is exposed externally when the display portion is in said closed state.

5. A method of receiving an incoming call, comprising, by a mobile communication terminal comprising a display portion to display an image, said display portion configured to change in state between an open state where a surface of an operation portion is exposed and a closed state where the surface of said operation portion is covered by said display portion:
  detecting an incoming call;
  detecting said open state while detecting said incoming call;
  after detecting said open state, detecting said closed state while detecting said incoming call; and,
  in response to detecting said closed state, causing the terminal to go off-hook.

* * * * *